(12) United States Patent
Sugo et al.

(10) Patent No.: US 11,881,062 B2
(45) Date of Patent: Jan. 23, 2024

(54) CONTROL DEVICE OF WORKING VEHICLE

(71) Applicant: TOYOTA JIDOSHA KABUSHIKI KAISHA, Aichi-ken (JP)

(72) Inventors: Yuki Sugo, Toyota (JP); Makoto Hirai, Toyota (JP); Masaki Numakura, Miyoshi (JP); Tomohiro Sato, Tajimi (JP); Taiga Higuchi, Toyota (JP); Hiroyuki Azuma, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/706,604

(22) Filed: Mar. 29, 2022

(65) Prior Publication Data

US 2022/0319248 A1 Oct. 6, 2022

(30) Foreign Application Priority Data

Apr. 2, 2021 (JP) .................................. 2021-063533

(51) Int. Cl.
*G07C 5/02* (2006.01)
*B60W 30/182* (2020.01)

(52) U.S. Cl.
CPC ............. *G07C 5/02* (2013.01); *B60W 30/182* (2013.01)

(58) Field of Classification Search
CPC ......... B60W 30/182; B60W 2300/152; B60W 2540/18; G05D 1/0214; G05D 1/0276; G05D 2201/0201; G07C 5/02; A01B 69/00–028

USPC .......................................................... 701/22
See application file for complete search history.

(56) References Cited

U.S. PATENT DOCUMENTS

| | | | |
|---|---|---|---|
| 11,237,563 B2* | 2/2022 | Javault ................ | A01C 21/005 |
| 2018/0060375 A1* | 3/2018 | Blank ................... | B60K 31/02 |
| 2019/0003148 A1* | 1/2019 | Andou ................. | E02F 9/2058 |
| 2020/0029490 A1* | 1/2020 | Bertucci .............. | G06V 20/58 |
| 2020/0113123 A1* | 4/2020 | Shearer ............... | A01B 79/005 |
| 2020/0130693 A1 | 4/2020 | Yagyu et al. | |
| 2020/0363796 A1* | 11/2020 | Muro .................. | G05D 1/0088 |
| 2020/0383260 A1* | 12/2020 | Foster ................. | A01B 69/007 |
| 2021/0000006 A1* | 1/2021 | Ellaboudy ............ | G06V 20/56 |
| 2021/0061374 A1* | 3/2021 | Hudson ................ | B62D 21/186 |
| 2021/0146995 A1* | 5/2021 | Miyashita ............ | B62D 1/046 |
| 2021/0199440 A1* | 7/2021 | Kinugawa ............ | G01C 21/20 |
| 2021/0267115 A1* | 9/2021 | Fjelstad ............... | G05D 1/0257 |
| 2021/0272255 A1* | 9/2021 | Barrick ................ | A01B 79/005 |
| 2021/0274772 A1* | 9/2021 | Long .................... | B05B 12/08 |
| 2022/0124962 A1* | 4/2022 | Long .................... | B05B 1/202 |

(Continued)

FOREIGN PATENT DOCUMENTS

| | | |
|---|---|---|
| JP | 2006220567 A | 8/2006 |
| WO | 2019003712 A1 | 1/2019 |

*Primary Examiner* — Fadey S. Jabr
*Assistant Examiner* — Mohamed Abdo Algehaim
(74) *Attorney, Agent, or Firm* — HAUPTMAN HAM, LLP

(57) ABSTRACT

Provided is a control device of a working vehicle including a prime mover and a driving mechanism that drives an implement based on power of the prime mover, wherein the control device is configured to obtain a steering angle of the working vehicle, and detect switching between tasks performed by the working vehicle in a farm field, when the steering angle is equal to or greater than a predetermined angle indicating the switching between tasks.

6 Claims, 6 Drawing Sheets

(56) References Cited

U.S. PATENT DOCUMENTS

| | | | |
|---|---|---|---|
| 2022/0129000 A1* | 4/2022 | Ingvalson | G06Q 10/06314 |
| 2022/0279698 A1* | 9/2022 | Yoshimura | A01B 69/004 |
| 2022/0295685 A1* | 9/2022 | Matsuzaki | B60W 60/001 |
| 2022/0338404 A1* | 10/2022 | Tanaka | A01B 76/00 |
| 2022/0348089 A1* | 11/2022 | Sugo | B60L 58/25 |
| 2022/0348322 A1* | 11/2022 | Zemenchik | A01B 76/00 |
| 2022/0412054 A1* | 12/2022 | Takeo | E02F 9/00 |

\* cited by examiner

CONTROL DEVICE OF WORKING VEHICLE

CROSS-REFERENCE TO RELATED APPLICATION

This application is based upon and claims the benefit of priority of the prior Japanese Patent Application No. 2021-063533, filed on Apr. 2, 2021, the entire contents of which are incorporated herein by reference.

FIELD

The present disclosure relates to a control device of a working vehicle.

BACKGROUND

There has been known a control technique that adjusts the rotation speed of the rotating body that sprays dusting powders such as fertilizers, chemicals, or the like to be zero (stops the rotating body) when the current location where the tractor is running is near the boundary of the farm field based on the positional information of the global positioning system (GPS). This prevents the dusting powders from being sprayed to the road which is out of bounds as disclosed in International Publication No. 2019/003712.

SUMMARY

The tasks may be switched every time a working vehicle such as a tractor turns around at boundaries in a farm field. For example, the working vehicle may spray fertilizers to the farm field before turning around at the boundary, and spray chemicals to the farm field after turning around at the boundary.

In the case of using the positional information of the GPS described above, it may be impossible to accurately measure the turnaround of the working vehicle in the farm field because of the communication period. As a result, the working vehicle may start spraying chemicals before turning around at the boundary, or may keep spraying fertilizers even after turning around at the boundary. Accordingly, it is difficult to precisely detect the switching between the tasks performed by the working vehicle in the farm field in the case of using the positional information of the GPS.

Therefore, the objective of the present disclosure is to precisely detect switching between tasks performed by a working vehicle in a farm field.

The above object is achieved by a control device of a working vehicle including a prime mover and a driving mechanism that drives an implement based on power of the prime mover, wherein the control device is configured to: obtain a steering angle of the working vehicle; and detect switching between tasks performed by the working vehicle in a farm field, when the steering angle is equal to or greater than a predetermined angle indicating the switching between tasks.

In the above configuration, the control device may be configured to obtain traveling information that can be detected or calculated based on running of the working vehicle, and identify a task detail during the running of the working vehicle based on the traveling information obtained from when the switching between tasks is detected until when the switching between tasks is detected next.

In the above configuration, the control device may be configured to obtain a vehicle operating time from when an ignition switch of the working vehicle is turned on until when the ignition switch of the working vehicle is turned off, estimate a season when the working vehicle is operating based on the vehicle operating time, and identify the task detail based on the estimated season and the traveling information.

In the above configuration, the control device may be configured to, when detecting an anomaly of the working vehicle during the running of the working vehicle, change an evacuation running mode of evacuation running that evacuates the working vehicle to a safe place based on the identified task detail.

In the above configuration, the traveling information may include energy consumption of the prime mover, a travel distance of the working vehicle, a vehicle speed of the working vehicle, or any combination thereof.

In the above configuration, the control device may be configured to change a driving force map to a driving force map corresponding to the identified task detail among driving force maps that define relationships between a driving force that drives the implement and a vehicle speed of the working vehicle with respect to each task detail.

In the above configuration, the control device may be configured to detect the switching between tasks when the steering angle is equal to or greater than the predetermined angle in the farm field regardless of whether the working vehicle is equipped with a global positioning system (GPS).

In the above configuration, the working vehicle may be an electric vehicle equipped with a motor without an engine.

Advantageous Effects

According to the present disclosure, switching between tasks performed by a working vehicle can be precisely detected.

DETAILED DESCRIPTION

Hereinafter, embodiments of the present disclosure will be described with reference to the accompanying drawings.

First Embodiment

Figure 1:
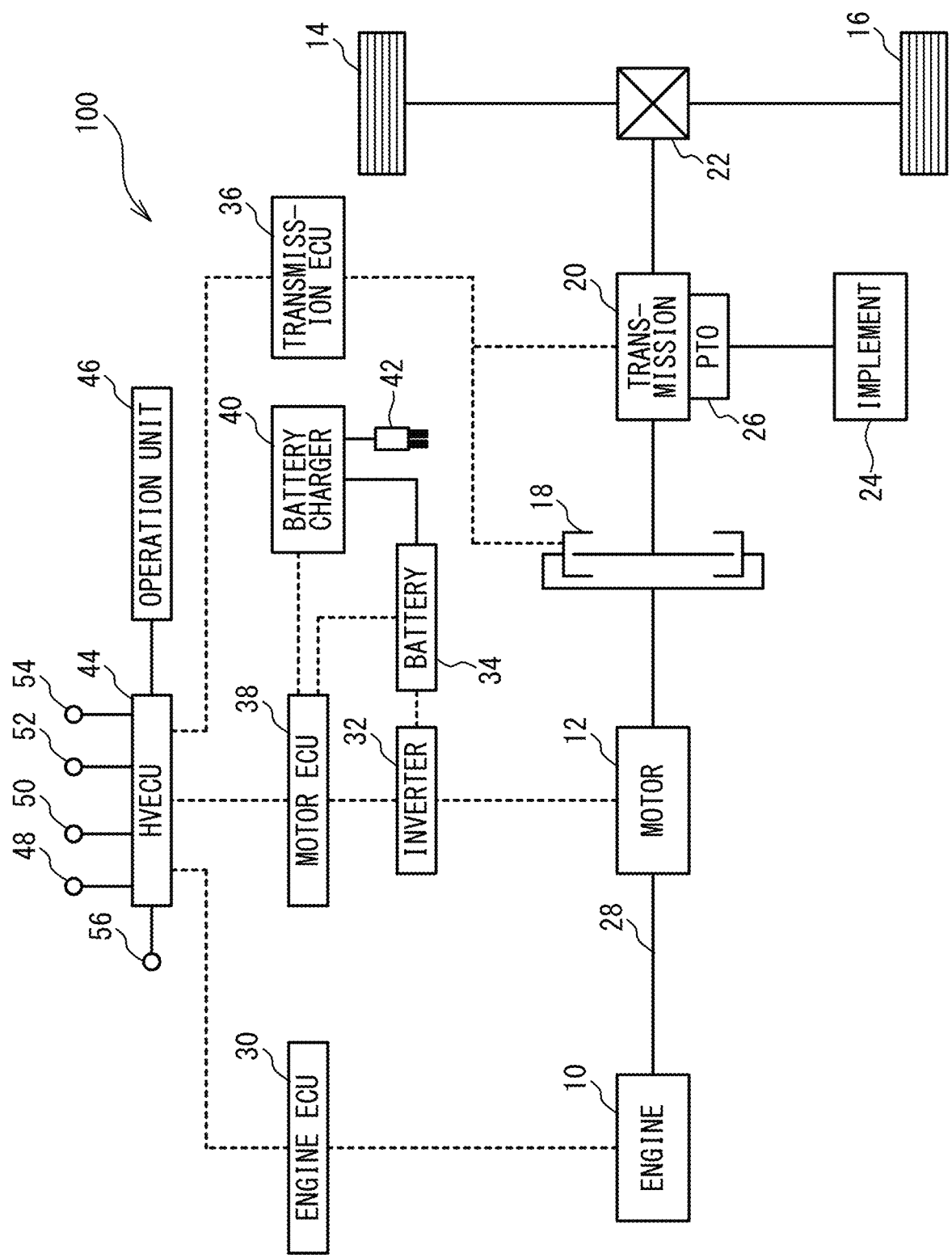
FIG. 1 is a block diagram illustrating a configuration of a working vehicle.

As illustrated in FIG. 1, a working vehicle 100 is a plug-in hybrid vehicle (PHV)-type agricultural vehicle that runs while towing an implement 24 using the electric power supplied from a battery 34 as a driving force. Examples of the agricultural vehicle include, but are not limited to, a tractor, a combine harvester, and a rice transplanter.

In the present embodiment, the PHV type will be described as an example of the type of the working vehicle 100, but the type of the working vehicle 100 may be a hybrid vehicle (HV) type. Alternatively, the type of the working vehicle 100 may be an electric vehicle (EV) type or a fuel cell vehicle (FCV) type.

In the working vehicle 100, an engine 10 and a motor (more specifically, a motor generator) 12 as prime movers are arranged in series on a power transmission path. The engine 10 outputs a rotative power by consuming the burning energy from fuel. The motor 12 outputs a rotative power by consuming the electric energy. A clutch 18, a transmission 20, and a differential gear 22 are disposed between the motor 12 and rear drive wheels 14 and 16. A power take off (PTO) mechanism (simply referred to as PTO in FIG. 1) 26 is disposed between the transmission 20 and the implement 24.

The engine 10 outputs the rotative power from a crankshaft 28 by burning of fuel (for example, hydrocarbon-based fuel such as gasoline or diesel fuel). The rotative power of the crankshaft 28 is transmitted to the rotating shaft of the motor 12, and is also transmitted to the input shaft of the transmission 20 through the clutch 18. The engine 10 has various sensors (an engine speed sensor and the like) and actuators (an actuator driving a throttle valve and the like). The engine 10 is coupled to an engine electronic control unit (ECU) 30. The engine 10 is controlled by the engine ECU 30.

The motor 12 drives as an electric motor and also drives as a power generator. The rotating shaft of the motor 12 rotates in conjunction with the crankshaft 28 of the engine 10, and rotates in conjunction with the input-side member of the clutch 18. The motor 12 exchanges the electric power with the battery 34 through an inverter 32. The motor 12 can generate power using the rotative power output from the engine 10 to the crankshaft 28 to charge the battery 34. The motor 12 can regenerate power using the rotative power from the transmission 20 to charge the battery 34. The motor 12 can output the rotative power to the crankshaft 28 and the transmission 20 using the electric power from the battery 34.

The clutch 18 is a device that connects the rotative power from the motor 12 to the transmission 20 in stages. The clutch 18 is coupled to a transmission ECU 36. The clutch 18 is controlled by the transmission ECU 36.

The transmission 20 is a mechanism to which the rotative power output from one or both of the engine 10 and the motor 12 is input through the clutch 18, and is also a mechanism that shifts the input rotative power to transmit it to the rear drive wheels 14 and 16 through the differential gear 22. The transmission 20 can selectively output the input rotative power to the differential gear 22 or the PTO mechanism 26. The transmission 20 has a structure that can select gear mechanisms having different gear ratios with use of a synchronizing system. The rotative power input to the transmission 20 is shifted by the selected gear mechanism and is then output to the differential gear 22. When the PTO mechanism 26 is selected by the synchronizing system, the transmission 20 outputs the rotative power input to the transmission 20 to the implement 24 through the PTO mechanism 26. The transmission 20 includes an actuator that drives the synchronizing system. The transmission 20 is coupled to the transmission ECU 36. The transmission 20 is controlled by the transmission ECU 36.

The PTO mechanism 26 is a drive mechanism that extracts the rotative power output from the transmission 20 to drive the implement 24. The implement 24 is a device that performs various types of tasks in the farm field. The type of the implement 24 is not particularly limited. For example, the implement 24 may be a spraying device including a rotating body that sprays dusting powders such as fertilizers, chemicals, or the like or a planting device that plants seeds of agricultural crops or the like to the farm field. The implement 24 may be a cultivator that performs cultivation, or may be a harvesting device that harvests. The implement 24 may be a reaper device that reaps pasture grass or the like, or a spreading device that spreads pasture grass or the like. The implement 24 may be a grass collector that collects pasture grass or the like, or may be a shaping device that shapes pasture grass or the like. When the rotative power output from the PTO mechanism 26 is input to the hydraulic oil pump, the gear mechanism, or the like in the implement 24, the implement 24 operates. The implement 24 can also operate using the electric power supplied by the battery 34.

The inverter 32 controls the various operations (e.g., the driving operation, the power generation operation, and the regenerative operation) of the motor 12 according to control signals from a motor ECU 38. The inverter 32 is coupled to the battery 34 through a converter. The battery 34 is a charging apparatus that can be charged and discharge. Examples of the battery 34 include, but are not limited to, a lithium-ion secondary battery. The battery 34 may be a secondary battery other than the lithium-ion secondary battery. The battery 34 has a charging capacity and discharge capability sufficient for the working vehicle 100 to run using the electric power as a main driving force. In addition, the battery 34 has a charging capacity and discharge capability sufficient for the implement 24, which needs large electric power, to continuously operate.

The engine ECU 30 controls the operation of the engine 10. The engine ECU 30 is coupled to various actuators built in the engine 10, various sensors, and an HVECU 44. The motor ECU 38 controls the operation of the motor 12 through the inverter 32. In addition, the motor ECU 38 detects the state of charge (SOC) of the battery 34. The motor ECU 38 is coupled to the inverter 32, a battery charger 40, and the HVECU 44.

A battery ECU may be provided in the working vehicle 100, and the battery ECU may calculate the state of charge (SOC) of the battery 34, and the motor ECU 38 may detect the SOC of the battery ECU. For example, the battery ECU can calculate the state of charge (SOC) that is a ratio of the capacity of the power that can be discharged from the battery 34 at a certain time to the total capacity, based on the integrated value of the input-output current detected by a current sensor 52 described later. The battery ECU can calculate the SOC based on the voltage between terminals detected by a voltage sensor 54 described later, and a predetermined map indicating the relationship between the voltage between the terminals and the SOC. The battery ECU may compare these two SOCs, and employ the corrected SOC obtained by correcting one of the SOCs when there is a difference equal to or greater than a predetermined difference. The battery ECU can also measure the time when the ignition switch including a power switch, which will be described later, is turned on and the time when the ignition switch is turned off, and can identify the vehicle operating time of the working vehicle 100.

A power cable 42 that can be coupled to an external power source (for example, a commercial power source) is coupled to the battery charger 40. The battery charger 40 charges the battery 34 with the electric power supplied from the external power source. The battery charger 40 has charging capability sufficient to charge the battery 34, and has capability of supplying the power required for the maximum output of the PTO mechanism 26.

The transmission ECU 36 controls operations of the clutch 18 and the transmission 20. The transmission ECU 36 is coupled to various actuators, various sensors, and the HVECU 44. The HVECU 44 controls operations of the engine ECU 30, the transmission ECU 36, and the motor ECU 38. The HVECU 44 is coupled to various sensors such as a steering angle sensor 48, a vehicle speed sensor 50, the current sensor 52, and the voltage sensor 54, a GPS 56, and a navigation device (not illustrated). In FIG. 1, the GPS 56 and the navigation device are coupled to the HVECU 44, but neither the GPS 56 nor the navigation device may be provided in the working vehicle 100. In this case, neither the GPS 56 nor the navigation device is coupled to the HVECU 44.

The steering angle sensor 48 is a sensor that detects the steering angle of the front drive wheel or a steering mechanism (not illustrated). The vehicle speed sensor 50 is a sensor that detects the vehicle speed, which is part of the traveling information of the working vehicle 100. The current sensor 52 is a sensor that is mounted to the power line connected to the output terminal of the battery 34, and detects the input-output current (more specifically, the charging current and the discharging current) of the battery 34. The voltage sensor 54 is a sensor that is disposed between the terminals of the battery 34, and detects the voltage between the terminals of the battery 34. The GPS 56 is a device that receives radio waves emitted from GPS satellites, and measures the current location of the working vehicle 100 on the ground or on a map based on the received radio waves. The navigation device stores roadway information and map information.

The HVECU 44 is also coupled to various switches including, for example, the ignition switch, an operation unit 46, the engine ECU 30, the transmission ECU 36, and the motor ECU 38. The HVECU 44 outputs control signals to the engine ECU 30, the transmission ECU 36, and the motor ECU 38 by executing the program according to the flowchart described later in response to the situation of the working vehicle 100. The HVECU 44 controls the start and the stop of the engine 10 through the engine ECU 30, and controls the driving, the power generation and the regeneration of the motor 12 through the motor ECU 38.

The engine ECU 30, the motor ECU 38, the transmission ECU 36, and the HVECU 44 are all configured as microprocessors dominated by central processing units (CPUs). Each of these ECUs includes a read only memory (ROM) storing a program and various types of maps, a random access memory (RAM) temporarily storing data, an input port, an output port, and a communication port, in addition to the CPU. The ROM includes a nonvolatile memory such as an electrically erasable programmable read only memory (EEPROM).

The engine ECU 30 controls the operation of the engine 10 by executing a predetermined program according to the control signal from the HVECU 44. The motor ECU 38 controls the operation of the motor 12 by executing a predetermined program according to the control signal from the HVECU 44. The motor ECU 38 controls the operation of the battery charger 40 by executing a predetermined program according to the control signal from the HVECU 44. The transmission ECU 36 controls the clutch 18 and the transmission 20 by executing a predetermined program according to the control signal from the HVECU 44.

The operation unit 46 includes a PTO gearshift lever that adjusts or sets the rotation speed (or the driving speed) of the PTO shaft in the PTO mechanism 26. By using the PTO gearshift lever, the rotation speed of the PTO shaft can be adjusted in four stages, from a first speed that is the lowest rotation speed to a fourth speed that is the highest rotation speed. In addition, by setting the PTO gearshift lever to a neutral position, the rotation speed of the PTO shaft can be made to be 0 (zero).

In FIG. 1, when the type of the working vehicle 100 is an EV type or a plug-in electric vehicle (PEV) type, an EVECU is provided to the working vehicle 100 instead of the HVECU 44. In this case, the working vehicle 100 may not necessarily include the engine 10, the engine ECU 30, or the crankshaft 28.

Next, with reference to FIG. 2 and FIG. 3, the process executed by the HVECU 44 in accordance with the first embodiment will be described. The HVECU 44 executes various processes at regular intervals (for example, every one second) while the ignition switch is ON, regardless of whether the working vehicle 100 is running or stopped.

Figure 2:
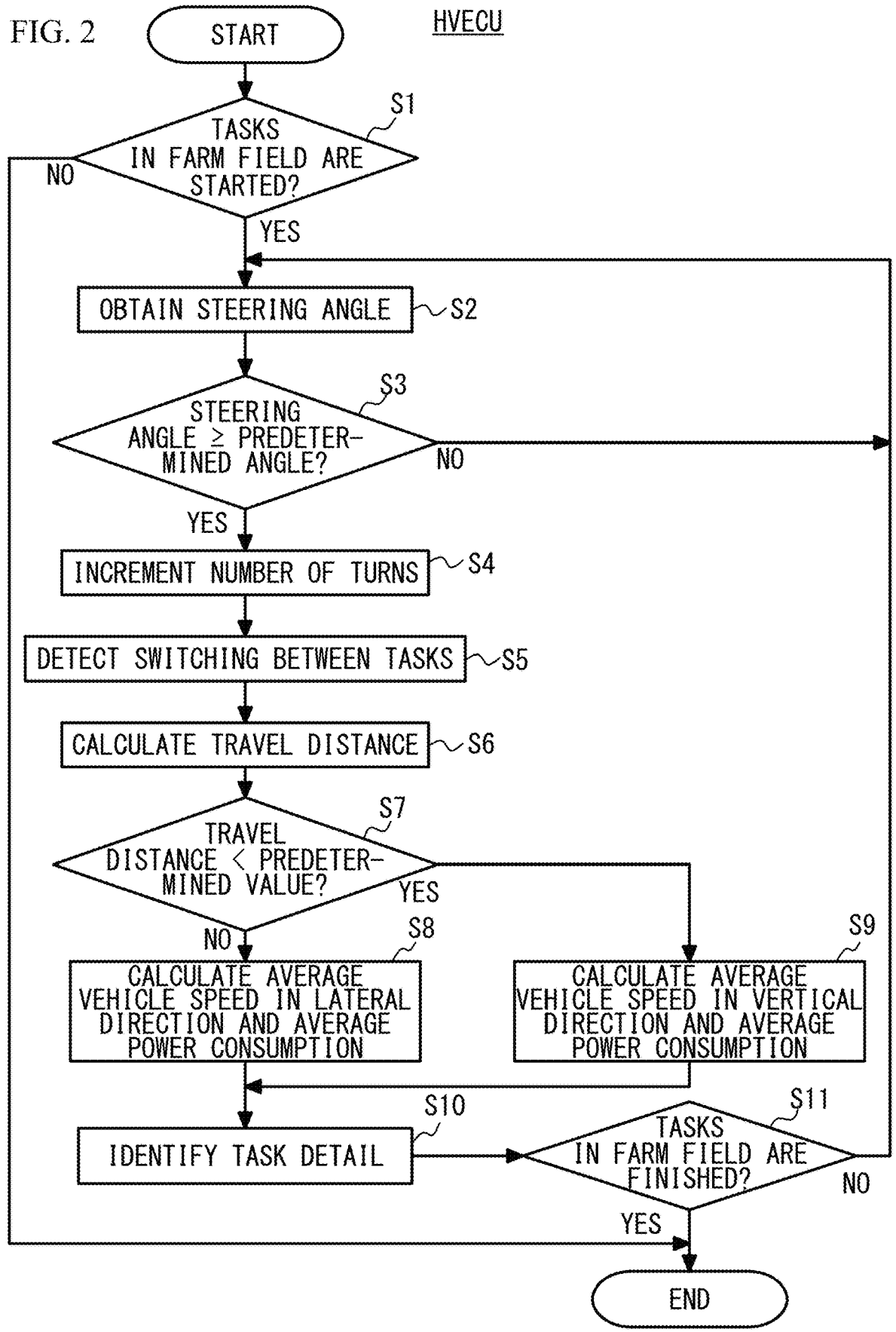
FIG. 2 is a flowchart of a process executed by an HVECU in accordance with a first embodiment.
Figure 3:
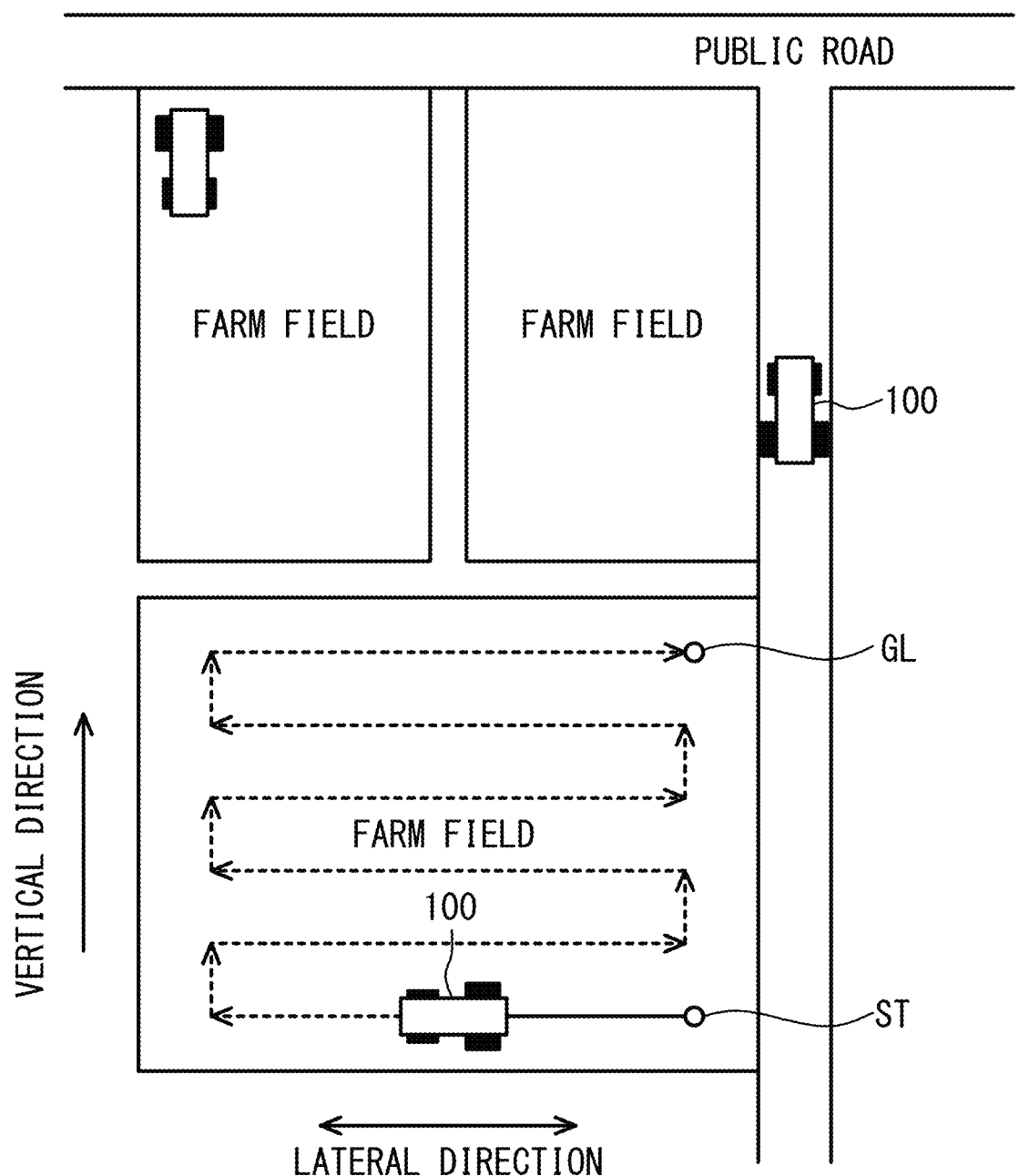
FIG. 3 illustrates how the working vehicle runs.

First, as illustrated in FIG. 2, the HVECU 44 determines whether tasks in a farm field are started (step S1). For example, when the working vehicle 100 runs on a public road as illustrated in FIG. 3, the vehicle speed is higher than when the working vehicle 100 runs in the farm field. Therefore, when the vehicle speed of the working vehicle 100 is equal to or greater than a predetermined value indicating the running on a public road, the HVECU 44 determines that tasks in the farm field are not started (step S1: NO), and ends the process. When the working vehicle 100 is equipped with the GPS 56, the HVECU 44 may determine whether tasks are started by determining whether the working vehicle 100 enters the farm field based on the positional information of the GPS 56 and the map information of the navigation device.

On the other hand, when the vehicle speed of the working vehicle 100 is less than the predetermined value, the HVECU 44 determines that tasks in the farm field have been started (step S1: YES). In this case, the HVECU 44 obtains the steering angle (step S2), and determines whether the steering angle is equal to or greater than a predetermined angle that indicates switching between the tasks performed by the working vehicle 100 in the farm field (step S3). When the steering angle is less than the predetermine angle (step S3: NO), the process returns to step S2. Thus, the processes of steps S2 and S3 are repeated till the steering angle becomes equal to or greater than the predetermined angle.

When the steering angle is equal to or greater than the predetermined angle (step S3: YES), the number of turns is incremented (step S4), and the switching between the tasks is detected (step S5). As illustrated in FIG. 3, when the working vehicle 100 running in the farm field reaches the vicinity of the border of the farm field, the working vehicle 100 turns around, and runs in the opposite direction to the previous traveling direction. The border of the farm field may be the boundary between the farm field and a public road or a private road (for example, a farm road located between two farm fields), or may be a boundary between the farm field of the user and the farm field of another person.

In more details, the working vehicle 100 starts running from the task starting position ST and runs in the lateral direction away from the task starting position ST. When reaching the vicinity of the border of the farm field, the working vehicle 100 turns 90 degrees rightward (i.e., turns right), and runs for a second distance, which is shorter than the first distance for which the working vehicle 100 runs in the lateral direction, in the vertical direction. As a result, the number of turns becomes one. Then, when finishing running for the second distance, the working vehicle 100 turns 90 degrees rightward, and then runs in the lateral direction again. As a result, the number of turns becomes two.

As described above, when the working vehicle 100 turns back the path, the working vehicle 100 turns twice. It is impossible to measure the number of turns described above accurately using the positional information of the GPS 56 because of the communication period. Depending on the working vehicle 100, the working vehicle 100 may spray dusting powders such as fertilizers, chemicals, or the like before turning around at the boundary of the farm field, and plants seeds of agricultural crops after turning around at the boundary of the farm field. In this case, based on the first turn that changes the traveling direction from the lateral direction to the vertical direction, it can be assumed that another task will be carried out in the next run in the lateral direction. That is, it can be assumed that the task will be switched from spraying of dusting powders to planting of seeds. Therefore, when the steering angle is equal to or greater than the predetermined angle, the switching between the tasks can be detected.

When the switching between the tasks is detected, the HVECU 44 calculates the travel distance (step S6). The HVECU 44 can calculate the travel distance, which is part of the traveling information, based on the vehicle speed detected by the vehicle speed sensor 50 and the journey time. After calculating the travel distance, the HVECU 44 determines whether the travel distance is less than a predetermined value (step S7). The predetermined value indicates the travel distance in the vertical direction. When the travel distance is equal to or greater than the predetermined value (step S7: NO), the HVECU 44 can determine that the working vehicle 100 is running in the lateral direction, and calculates the average vehicle speed in the lateral direction and the average power consumption (step S8).

The vehicle speed and the power consumption as the traveling information of the working vehicle 100 may temporarily increase or decrease depending on the viscosity of the farm field and the type of the object to be reaped. Therefore, the HVECU 44 calculates the average vehicle speed and the average power consumption. The average vehicle speed can be calculated based on the temporal change in the vehicle speed and the number of times of detection of the vehicle speed during the traveling of the working vehicle 100 in the lateral direction, for example. The average power consumption can be calculated as the difference between the SOC of the battery 34 at the task starting position ST and the SOC when the working vehicle 100 turns, for example. The average power consumption may be calculated as the difference between the SOC at the time of the previous turn and the SOC at the time of the current turn.

On the other hand, when the travel distance is less than the predetermined value (step S7: YES), the HVECU 44 can determine that the working vehicle 100 is running in the vertical direction, and calculates the average vehicle speed in the vertical direction and the average power consumption (step S9). The average vehicle speed in the vertical direction and the average power consumption are calculated basically in the same manner as the average vehicle speed in the lateral direction and the average power consumption. Thus, the detailed description thereof will be omitted.

After calculating the average vehicle speed and the average power consumption, the HVECU 44 identifies the task detail (step S10). In the case of the working vehicle 100, unlike the passenger vehicle, the average vehicle speed varies according to the type of the implement 24 towed by the working vehicle 100. Similarly, according to the type of the implement 24, the average power consumption for driving the implement 24 varies. Therefore, when the average vehicle speed in the lateral direction and the average power consumption are calculated through the process of step S8, the type of the implement 24 corresponding to the average vehicle speed in the lateral direction and the average power consumption can be identified. Accordingly, the HVECU 44 can identify the task detail. When the average vehicle speed in the vertical direction and the average power consumption are calculated through the process of step S9, the task detail may be identified as the switching between the tasks, for example.

When the task detail is identified, the HVECU 44 determines whether the tasks in the farm field are finished (step S11). For example, the HVECU 44 determines whether the tasks in the farm field are finished based on whether the number of turns reaches a predetermined number of times indicating the number of turns corresponding to one farm field. When the number of turns does not reach the predetermined number of times, the HVECU 44 determines that the tasks in the farm field are not finished (step S11: NO). In this case, the process returns to step S2, and the HVECU 44 repeats the subsequent processes.

By contrast, when the number of turns reaches the predetermined number of times, the HVECU 44 determines that the tasks in the farm field are finished (step S11: YES), and ends the processes described above. For example, as illustrated in FIG. 3, when the working vehicle 100 reaches the task ending position GL and turns rightward (or leftward) one time, the HVECU 44 can determine that the tasks in the farm field are finished.

As described above, regardless of whether the working vehicle 100 is equipped with the GPS 56, in the farm field, the HVECU 44 obtains the steering angle of the working vehicle 100, and detects the switching between the tasks performed by the working vehicle 100 in the farm field when the obtained steering angle is equal to or greater than the predetermined angle. This allows for the precise detection of the switching between the tasks even when the positional information of the GPS 56 is not used in the farm field.

In addition, the HVECU 44 can estimate the season when the working vehicle 100 is operating by obtaining the operating time of the working vehicle 100 identified by the battery ECU. For example, when the operating time is equal to or greater than a predetermined time, it is estimated that the hours of sunlight is long, and thereby it can be estimated that the season is summer. This narrows the task detail down to the task details performed in the summer when there are some possibilities for the task detail identified in step S10, and the identification accuracy of the task detail is increased.

In addition, based on the identified task detail, the HVECU 44 may change the evacuation running mode for evacuation running that evacuates the working vehicle 100 to a safe place. For example, when the farm field is a rice field, and the HVECU 44 detects the electric leakage diagnosis as the vehicle anomaly of the working vehicle 100 while the working vehicle 100 is running, the HVECU 44 may stop the working vehicle 100 and notifies the operator of the evacuation from the working vehicle 100 using a warning sound or the like when it is the season when there is no water in the rice field. On the other hand, when it is the season when there is water in the rice field, there is a potential for electrical hazards due to electric leakage in the rice field. In this case, the HVECU 44 transitions to the evacuation running without stopping the working vehicle 100. This causes the operator to hesitate getting off from the working vehicle 100.

In addition, when the working vehicle 100 is an electric agricultural vehicle of an EV type or PEV (plug-in electric vehicle) type, the working vehicle 100 does not have the engine 10. Thus, when the SOC becomes empty, the working vehicle 100 may stop in the middle of the task. Additionally, in this case, it may become difficult for the working vehicle 100 to go out from the inside of the farm field to the outside of the farm field. However, when the EVECU calculates and controls the average power consumption, the depletion of the SOC can be avoided, the stopping of the working vehicle 100 in the middle of the task is prevented, and the smooth exit from the inside of the farm field to the outside of the farm field can be secured.

Second Embodiment

Figure 4A:
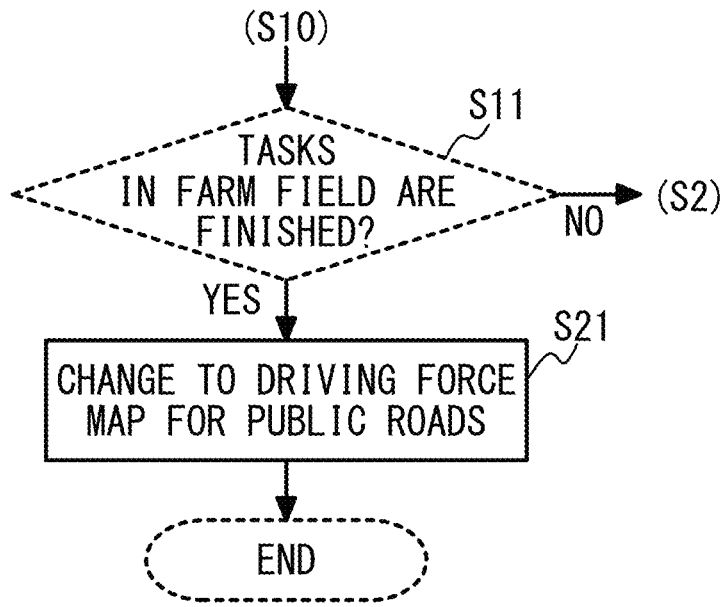
FIG. 4A is a flowchart (No. 1) of a part of a process executed by an HVECU in accordance with a second embodiment.
Figure 4B:
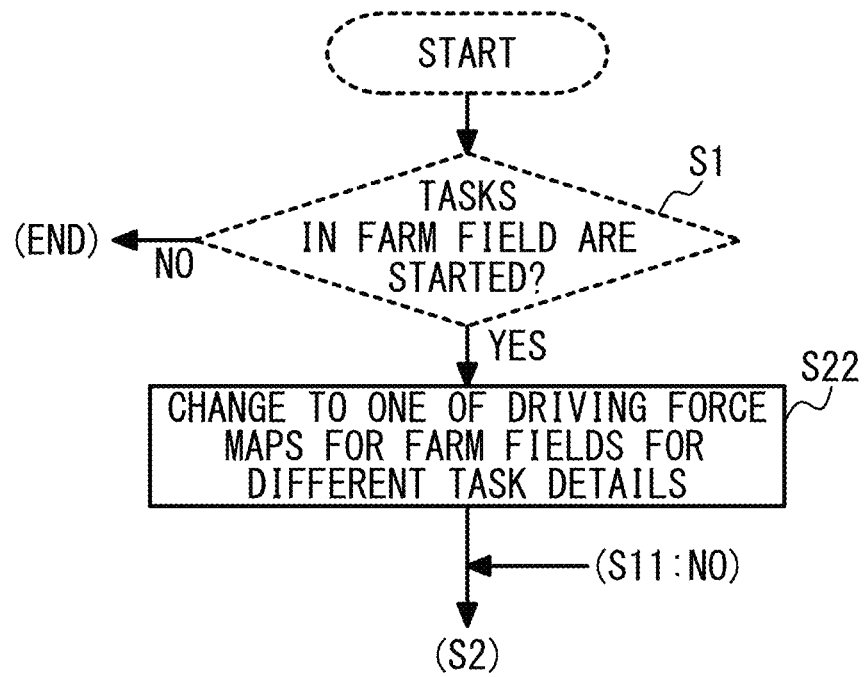
FIG. 4B is a flowchart (No. 2) of a part of the process executed by the HVECU in accordance with the second embodiment.
Figure 5:
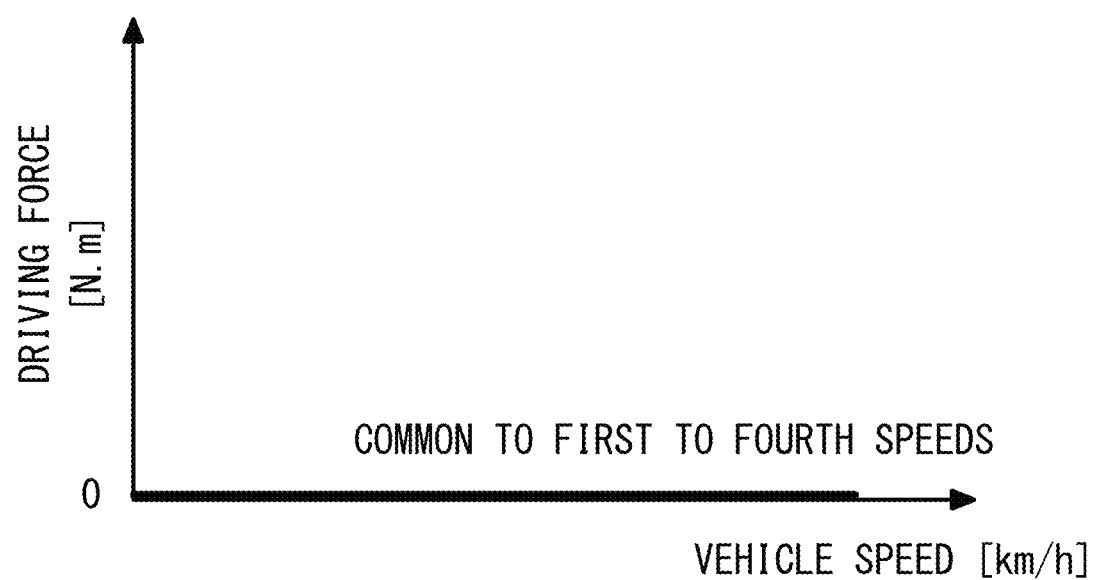
FIG. 5 is an example of a driving force map for public roads.

With reference to FIG. 4 to FIG. 6, a second embodiment of the present disclosure will be described. In FIG. 4A and FIG. 4B, the same processes as those in FIG. 2 are provided with the same reference numerals as those in FIG. 2, and are indicated by dashed lines, and the detailed description thereof is thus omitted.

First, as illustrated in FIG. 4A, when the HVECU 44 determines that the tasks in the farm field are finished in step S11 described above, the HVECU 44 changes the driving force map to the driving force map for public roads (step S21), and ends the process. More specifically, the HVECU 44 changes the driving force map of the PTO mechanism 26 from the driving force map for farm fields to the driving force map for public roads.

The driving force map for public roads is a map where the driving force becomes 0 (zero) even when the rotation speed of the PTO shaft is adjusted to any one of the first to fourth speeds as illustrated in FIG. 5. On the other hand, although the details will be described later, the driving force map for farm fields is a map that causes, when the rotation speed of the PTO shaft is adjusted to one of the first to fourth speeds, the driving force corresponding to the adjusted rotation speed to be output. The driving force map can be created by recording the vehicle speed of the working vehicle 100 and the driving force of the PTO mechanism 26 that are output when a certain rotation speed is input, with respect to each task detail in advance. The driving force map is stored in the ROM of the HVECU 44 to be managed.

As a result, even when the working vehicle 100 finishes the tasks in the farm field, goes out from the inside of the farm field to the outside of the farm field, and runs on a public road, the driving force of the PTO mechanism 26 is not generated, and the implement 24 does not operate. This allows the implement 24 to avoid scattering dusting powders, mud, or the like even when the operator erroneously manipulate the PTO gearshift lever in the operation unit 46 during the traveling on the public road. In addition, since the implement 24 is not operated, the working vehicle 100 can avoid endangering pedestrians walking near the working vehicle 100.

In addition, as illustrated in FIG. 4B, the HVECU 44 changes the driving force map to one of the driving force maps for farm fields for different task details (step S22) immediately after determining that the tasks in the farm field have been started in step S1 described above, and then executes the processes in and after step S2. In more detail, the HVECU 44 changes the driving force map of the PTO mechanism 26 from the driving force map for public roads to one of the driving force maps for farm fields for different task details, and then executes the processes in and after step S2. When changing the driving force map of the PTO mechanism 26 to one of the driving force maps for farm fields for different task details, the HVECU 44 selects the driving force map corresponding to the identified task detail based on the task detail identified in the process of step S10.

Figure 6A:
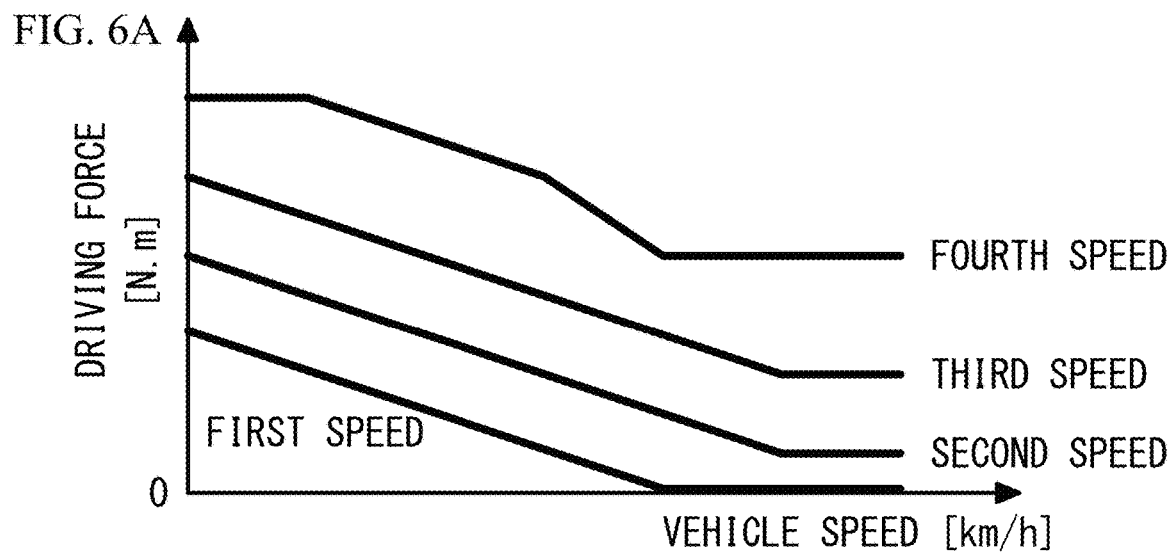
FIG. 6A is an example of a driving force map for farm fields corresponding to a first task detail.
Figure 6B:
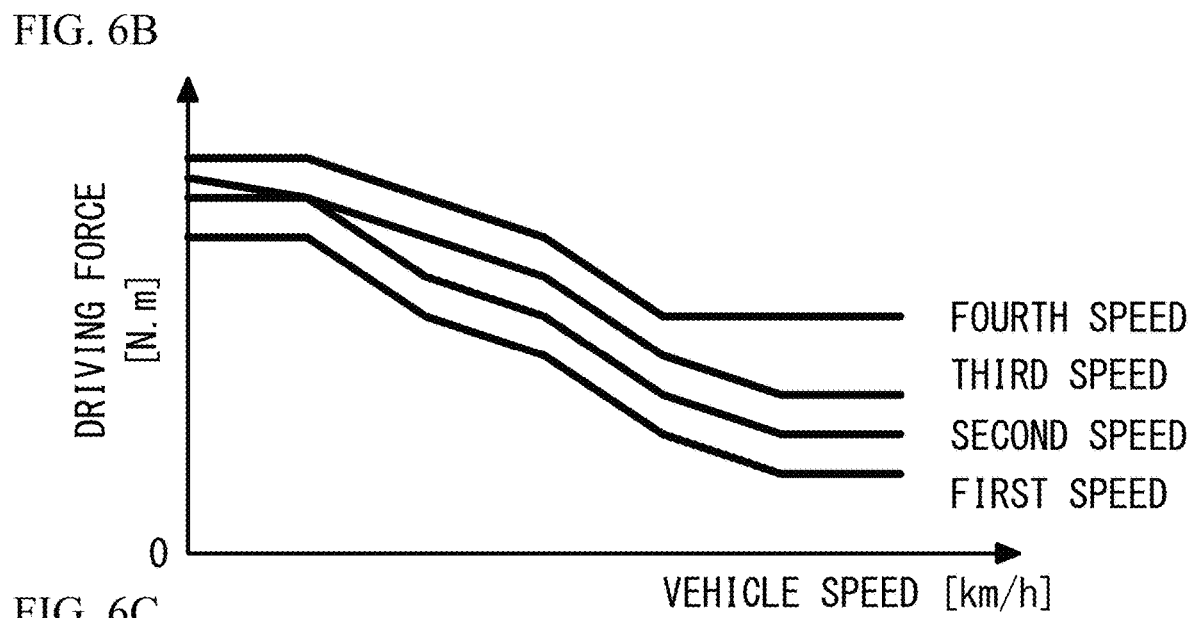
FIG. 6B is an example of a driving force map for farm fields corresponding to a second task detail.
Figure 6C:
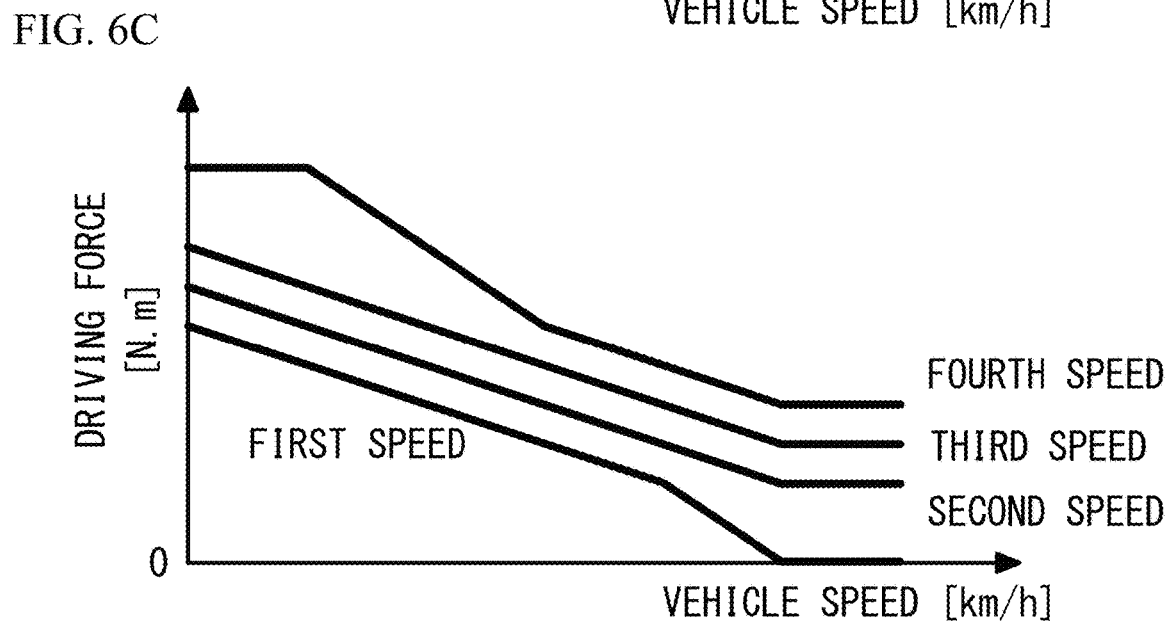
FIG. 6C is an example of a driving force map for farm fields corresponding to a third task detail.

The driving force map for farm fields is a map that causes, when the rotation speed of the PTO shaft included in the PTO mechanism 26 is adjusted to one of the first to fourth speeds, the driving force corresponding to the adjusted rotation speed to be output, as illustrated in FIG. 6A to FIG. 6C. For example, when the identified task detail is a first task detail that requires minute adjustment of the rotation speed of the PTO shaft, the HVECU 44 selects the driving force map corresponding to the first task detail as illustrated in FIG. 6A. Examples of the first task detail include, but are not limited to, harvesting of vegetables.

For example, the identified task detail is a second task detail that requires steep adjustment of the rotation speed of the PTO shaft, the HVECU 44 selects the driving force map corresponding to the second task detail as illustrated in FIG. 6B. Examples of the second task detail include, but are not limited to, cultivating of the farm field. On the other hand, when the task detail is a third task detail corresponding to a normal task different from the first task detail and the second task detail, the HVECU 44 selects the driving force map corresponding to the third task detail as illustrated in FIG. 6C. Examples of the third task detail include, but are not limited to, spraying of dusting powders such as fertilizers or chemicals. As described above, the second embodiment can dynamically control the driving force of the PTO shaft included in the PTO mechanism 26 according to the identified task detail.

Although some embodiments of the present invention have been described in detail, the present invention is not limited to the specific embodiments but may be varied or changed within the scope of the present invention as claimed.

For example, instead of the GPS 56, a button switch to be pressed down by the worker who is to get on the working vehicle 100 when the working vehicle 100 enters the farm field may be included in the operation unit 46. In this case, when detecting that the button switch is pressed down in the process of step S1, the HVECU 44 may determine that the tasks in the farm field have been started. In addition, in the embodiments described above, a plurality of ECUs including the HVECU 44, the engine ECU 30, and the motor ECU 38 perform various types of controls and processes in cooperation, but one ECU may perform various types of controls and processes alone. Further, in the embodiments described above, the predetermined angle is 90 degrees, but the predetermined angle is not limited to 90 degrees, and may be, for example, 88 degrees or 92 degrees, or may be a range of 88 to 92 degrees.

What is claimed is:
1. A control device of a working vehicle including a prime mover and a driving mechanism that drives an implement based on power of the prime mover,
wherein the control device that includes a memory and a processor coupled to the memory,
wherein the memory stores a program that, when executed by the processor, causes the processor to:
obtain a steering angle of the working vehicle;
detect switching between tasks performed by the working vehicle in a farm field, when the steering angle is equal to or greater than a predetermined angle indicating the switching between tasks;

obtain a vehicle speed of the working vehicle and energy consumption of the prime mover that can be detected or calculated based on running of the working vehicle as traveling information;

identify a task detail during the running of the working vehicle by identifying a type of the implement corresponding to the traveling information obtained from when the switching between tasks is detected until when the switching between tasks is detected next; and when detecting electric leakage as an anomaly of the working vehicle during the running of the working vehicle, change an evacuation running mode of the working vehicle to a first evacuation running mode that stops the working vehicle and notifies an operator of the evacuation from the working vehicle using a warning sound when the identified task detail is a first task in a first season when there is no water in the field, and change the evacuation running mode to a second evacuation running mode that evacuates the working vehicle by maintaining the running to a safe place when the identified task detail is a second task in a second season when there is water in the field.

2. The control device of the working vehicle according to claim 1, wherein the memory stores the program that, when executed by the processor, causes the processor to obtain a vehicle operating time from when an ignition switch of the working vehicle is turned on until when the ignition switch of the working vehicle is turned off, estimate a season when the working vehicle is operating based on the vehicle operating time, and identify the task detail based on the estimated season and the traveling information.

3. The control device of the working vehicle according to claim 1, wherein the energy consumption includes average energy consumption of the prime mover and the vehicle speed of the working vehicle includes average vehicle speed of the working vehicle.

4. The control device of the working vehicle according to claim 1, wherein the memory stores the program that, when executed by the processor, causes the processor to change a driving force map to a driving force map corresponding to the identified task detail among driving force maps that define relationships between a driving force that drives the implement and a vehicle speed of the working vehicle with respect to the identified task detail.

5. The control device of the working vehicle according to claim 1, wherein the memory stores the program that, when executed by the processor, causes the processor to detect the switching between tasks when the steering angle is equal to or greater than the predetermined angle in the farm field regardless of whether the working vehicle is equipped with a global positioning system (GPS).

6. The control device of the working vehicle according to claim 1, wherein the working vehicle is an electric vehicle equipped with a motor without an engine.

* * * * *